April 25, 1950     T. O. BRANDON     2,504,960
BEARING STRUCTURE FOR SEXTANTS OR THE LIKE Filed Dec. 10, 1946     3 Sheets-Sheet 1

Inventor
THOMAS O. BRANDON

By M. C. Hayes
Attorney

April 25, 1950   T. O. BRANDON   2,504,960
BEARING STRUCTURE FOR SEXTANTS OR THE LIKE
Filed Dec. 10, 1946   3 Sheets-Sheet 2

Inventor
THOMAS O. BRANDON
By  M. A. Hayes
Attorney

April 25, 1950  T. O. BRANDON  2,504,960
BEARING STRUCTURE FOR SEXTANTS OR THE LIKE
Filed Dec. 10, 1946  3 Sheets-Sheet 3

Inventor
THOMAS O. BRANDON

Attorney

Patented Apr. 25, 1950

2,504,960

UNITED STATES PATENT OFFICE 2,504,960

BEARING STRUCTURE FOR SEXTANTS OR THE LIKE

Thomas O. Brandon, United States Navy

Application December 10, 1946, Serial No. 715,233

9 Claims. (Cl. 116—124)

(Granted under the act of March 3, 1883, as amended April 30, 1928; 370 O. G. 757)

The invention relates to a positive precision bearing structure, and relates more particularly to a positive precision bearing of an endless tangent screw sextant.

An object of the invention is the provision of a positive precision bearing which is capable of maintaining definite and constant bearing properties throughout its contact surfaces and which provides balanced stability in the bearing assembly.

Another object of the invention is to provide a sextant micrometer tangent screw and bearing structure which eliminates the back-lash caused by end play occurring in the types of sextant micrometer screw and bearing at present in use.

A further object of the invention is the provision of a bearing structure which is adapted to improve with use.

Other objects and advantages of the invention will be more apparent from the following description taken in connection with the accompanying drawings which are exemplary and in which.

Figure 1:
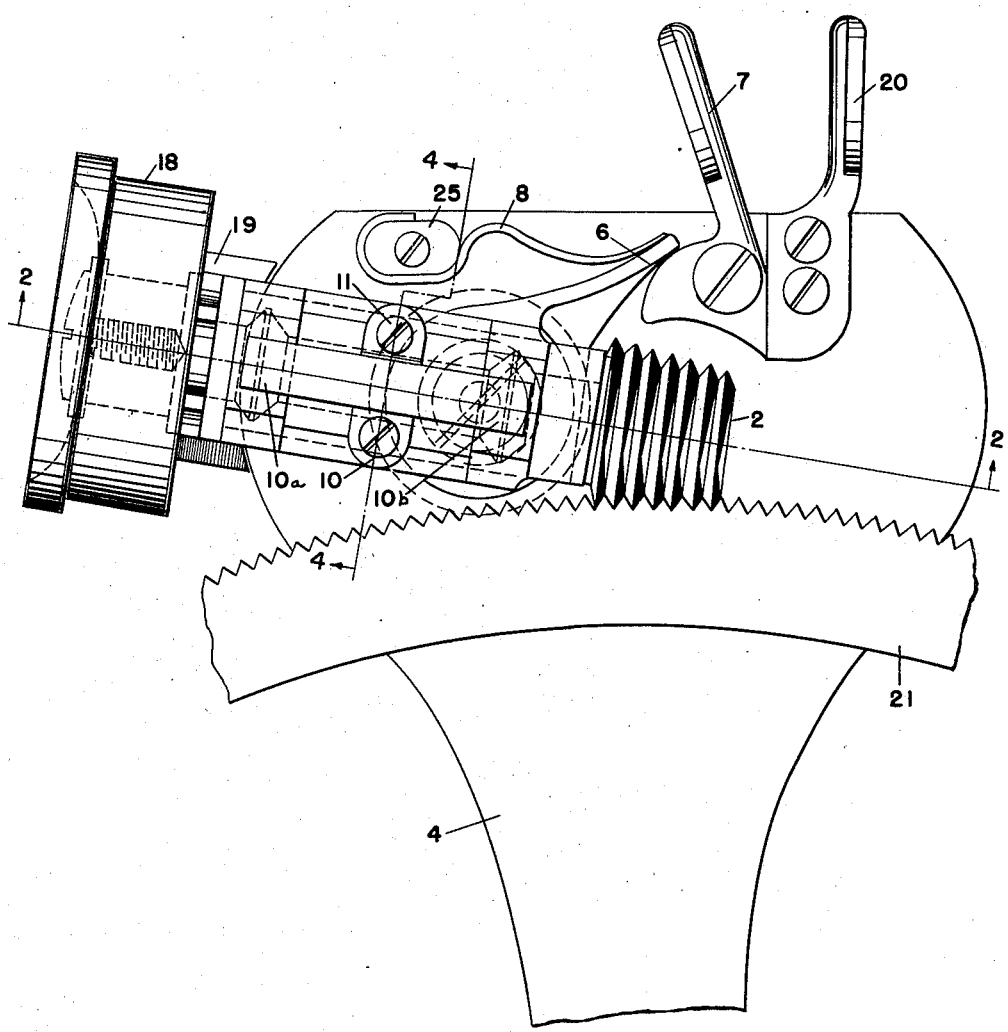
Fig. 1 is a view of a portion of a sextant embodying the bearing and associated structure of the invention.

Referring to the drawings, the numeral 1 represents the rotary shaft of the bearing structure of the invention, here shown as embodied in a tangent screw assembly of a sextant, and in this embodiment the shaft 1 carries the tangent worm 2. A portion of the periphery of the rotary shaft 1 is received in a bearing member 3 which is pivotally secured to the index arm 4 of the sextant by means of a screw 5. The screw 5 desirably overlies a bushing 24 received in an opening in the index arm 4. The bearing member or tangent arm 3 preferably carries a release finger 6 for actuation by the worm disengaging lever 7 against the action of the tangent spring 8 to rotate the bearing assembly about the pivot screw 5 to disengage the worm 2 from the sextant arc 21. The tangent spring 8 is secured to the index arm 4 by means of a bracket member 25.

Figure 4:
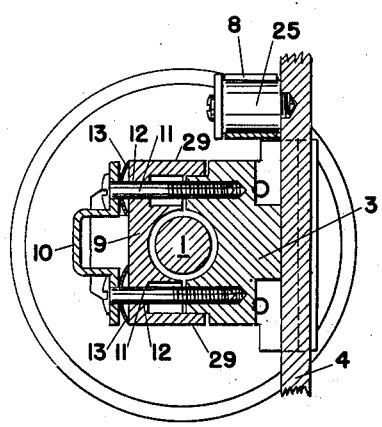
Fig. 4 is a view partly in section substantially on line 4—4 of Fig. 1.
Figure 5:
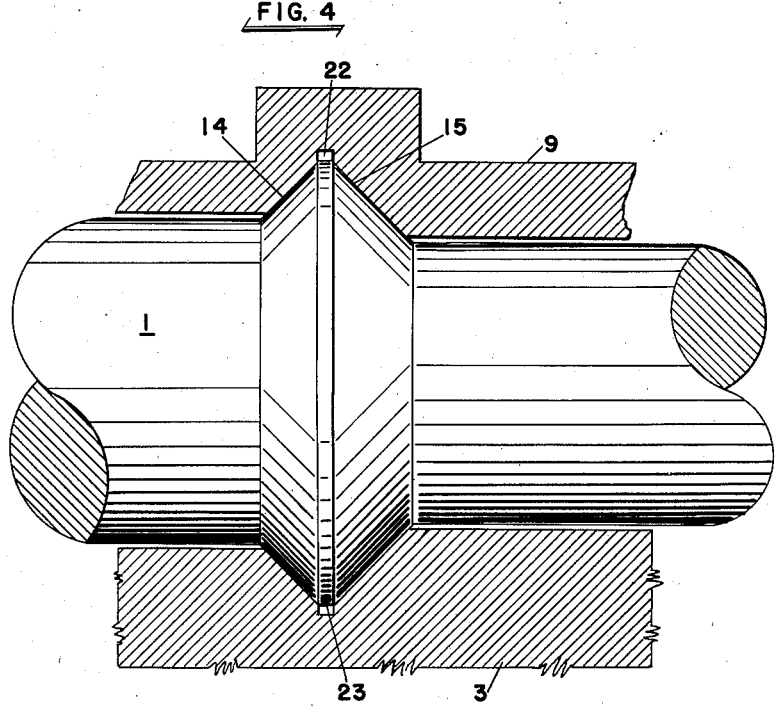
Fig. 5 is an enlarged fragmentary view partly in section showing the bearing surfaces and the relation between the rotary shaft and the bearing members.

An outer or cap bearing member 9 receives and engages a portion of the periphery of the rotary shaft and is urged into engagement therewith by a bearing spring means 10 secured to the outer ends of screw posts or guide pin members 11 which are secured to the inner or pivoted bearing member or tangent arm 3 and extend through openings 12 in the outer or cap bearing member 9. The bearing spring member 10 comprises a body portion extending longitudinally of said bearing and having spring ends 10a and 10b which engage the surface of the cap bearing member 9. Apertured ears extend from said bearing spring member and receive said pins and are retained by said pins. Desirably spring washer means 13 are disposed on said pins 11 between the spring member 10 and the surface of the cap bearing 9. The outer bearing member or cap 9 is preferably provided with depending flange portions 29 which embrace a portion of the bearing member 3 as seen in Fig. 4. The cap bearing member 9 is thus mounted for spring limited sliding movement relative to said pivoted bearing member 3 and against said rotary shaft 1.

Figure 2:
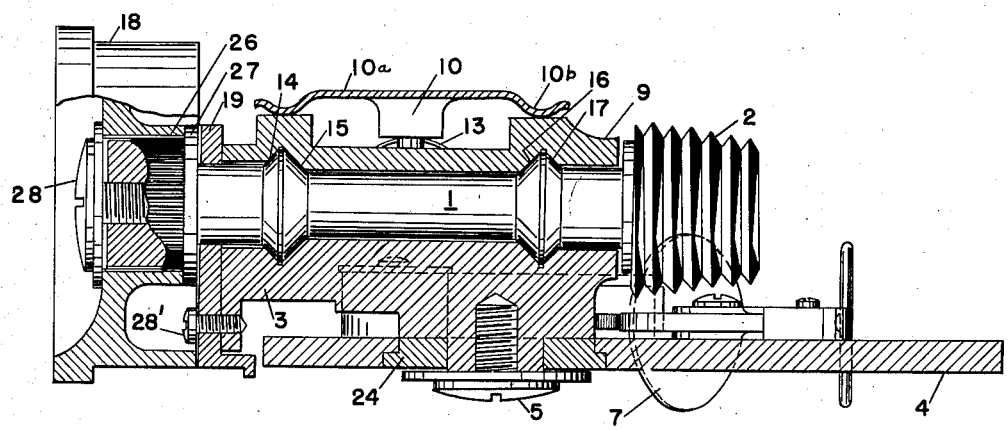
Fig. 2 is a view partly in section on line 2—2 of Fig. 1.
Figure 3:
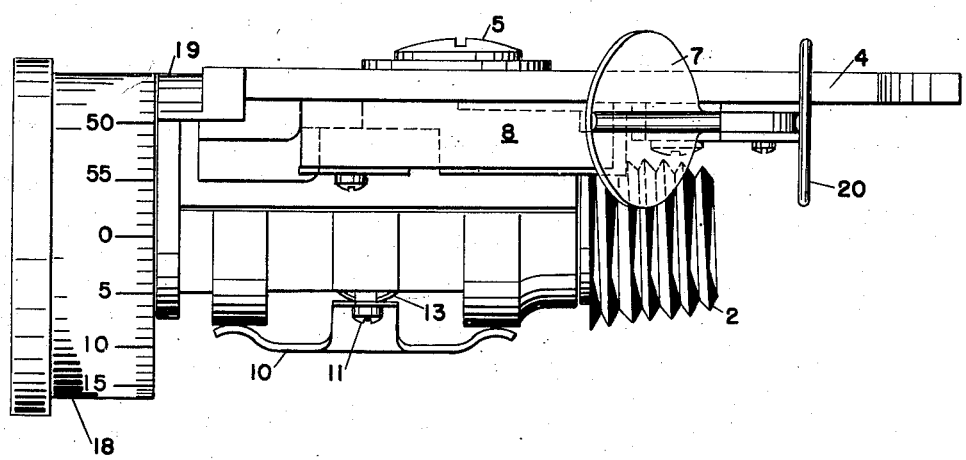
Fig. 3 is an external view of the bearing assembly of Figs. 1 and 2.

The tension on the spring means 10 and 13 is adjustable by means of the screw posts or pins 11. The rotary shaft 1 is provided with preferably a plurality of spaced apart annular enlarged portions preferably disposed one at each end of an inner cylindrical shaft portion of substantial length, the enlarged portions having oppositely facing inclined annular surfaces 14 and 15, and 16 and 17, respectively, and received in correspondingly shaped annular recesses formed in the bearing members 3 and 9. Desirably the surfaces may be, for example, at an angle 45° to the axis of the shaft. The shaft has cylindrical outer end portions extending beyond the inclined surfaces of said enlarged portions. According to the invention, the rotary shaft 1 and bearing members 3 and 9 are so constructed that the only engagement between the rotary shaft and the bearing members is at the inclined surfaces 14, 15, 16 and 17. Clearance or spacing is elsewhere provided between the adjacent surfaces of the rotary shaft and bearing members, as indicated at the cylindrical portions, and also provides space for lubricating grease. The said annular recesses formed in the bearing members may desirably include a central groove 22, spacing the bearing members from a flattened apex portion 23 preferably provided on the shaft 1. Desirably the central or inner cylindrical portion of the rotary shaft may be of reduced diameter in respect to the cylindrical outer end portions thereof as seen in Fig. 2, which provides increased inclined bearing surfaces 15 and 16. The spring ends 10a and 10b of the bearing spring member preferably engage the cap bearing member at points overlying the spaced bearing enlargements of the shaft. The present invention provides a bearing structure which is positive in action and capable of maintaining a constant bearing contact, is balanced and stable, and which will actually improve with use and wear and will eliminate the back-lash due to end play occurring in the known types of sextant micrometer screw bearings.

The worm disengaging lever 7 engages a fixed arm or lever 20 which is employed in the usual manner in operating the lever 7, to disengage the worm.

It will be observed that the shaft 1 is provided with a terminal hub 26 and a flange 27. The hub receives the micrometer drum 18 which abuts the flange 27 and is secured to the hub by means of screw 28. The shaft also receives a vernier member 19 embracing the shaft and interposed between the flange 27 and the bearing or tangent arm 3 and overlying the end thereof and overlying the end of the outer or cap bearing member. The vernier is suitably secured to the bearing member 3 as by means of screw means 28'. According to the invention, the hub 26 is milled to provide 60 teeth to fit corresponding V-shaped teeth provided in the drum bore. This provides for accurate adjustment to the minute in collimating the device. An adjustment of one or more teeth corresponding to one or more minutes, can be made by withdrawing the drum until the teeth are disconnected and rotating it a distance of one or more teeth, and then replacing it with the teeth connected in the newly adjusted position.

The inter-connected teeth provide a positive anti-slip connection between the drum and the hub irrespective of whether or not the screw 28 is fully tight, so that any possibility of mis-adjustment is substantially eliminated. The drum is also provided with 60 indicia divisions spaced around its periphery. Also for use in collimation, the screw holes in the vernier may be slightly larger than the screws to allow for some adjustment of the vernier in respect to the bearing and drum.

The entire assembly is capable of being readily assembled and disassembled, as will be readily apparent from the structure as described, and provides a rugged and long wearing assembly capable of maintaining absolute accuracy indefinitely.

While but one embodiment of the invention has been shown and described, it will be understood that the invention is not to be limited thereto and that numerous changes and modifications may be made therein without departing from the spirit and scope of the invention which is only to be limited by the terms of the appended claims.

The invention described herein may be manufactured and used by or for the Government of the United States of America for governmental purposes without the payment of any royalties thereon or therefor.

What is claimed is:

1. In a bearing structure, a rotary shaft member, a bearing member secured to a support and receiving a peripheral portion of the rotary shaft, a cap bearing member engaging a peripheral portion of the shaft and overlying the shaft and said secured bearing member, means connecting said bearing members comprising guide pin means secured to said secured bearing and extending through said cap bearing to permit slidable movement of said cap bearing on said pins relative to said secured bearing, and spring means secured to the outer ends of said pins and yieldably engaging said cap bearing to urge said cap bearing against the rotary shaft, said rotary shaft having an inner cylindrical portion of substantial length, and a plurality of spaced apart annular enlarged portions, one adjoining each end of said inner cylindrical shaft portion, and outer cylindrical shaft portions one adjoining the outer side of each of said annular enlarged portions, said spaced annular enlarged portions of said shaft each having oppositely facing annular inclined bearing surfaces, and said bearing members having correspondingly shaped bearing recesses to receive said oppositely facing inclined bearing surfaces of the annular enlargements of the rotary shaft, said inclined cooperating bearing surfaces of said plurality of annular enlargements and of said bearing recesses being of such dimensional extent as to provide definite spacing of the said inner and outer cylindrical portions of the rotary shaft from said bearing members, said spring means comprising a bearing spring member having a body portion extending longitudinally of said bearing and overlying said cap bearing member and having spring ends engaging said cap bearing member at points overlying said spaced annular enlarged portions of said rotary shaft, said bearing spring member having apertured ears extending laterally from said body portion and receiving and being retained by said pin means, said structure providing balanced stability in the bearing assembly.

2. In a bearing structure according to claim 1, spring washer means disposed between said cap bearing member and the said ears of said bearing spring member.

3. In a bearing structure, a rotary shaft member, a bearing member secured to a support and receiving a peripheral portion of the rotary shaft, a cap bearing member engaging a peripheral portion of the shaft and overlying the shaft and said secured bearing member, means connecting said bearing members comprising guide pin means secured to said secured bearing and extending through said cap bearing to permit slidable movement of said cap bearing on said pins relative to said secured bearing, and spring means secured to the outer ends of said pins and yieldably engaging said cap bearing to urge said cap bearing against the rotary shaft, said rotary shaft having an inner cylindrical portion of substantial length, and a plurality of spaced apart annular enlarged portions, one adjoining each end of said inner cylindrical shaft portion, and outer cylindrical shaft portions one adjoining the outer side of each of said annular enlarged portions, said spaced annular enlarged portions of said shaft each having oppositely facing annular inclined bearing surfaces, and said bearing members having correspondingly shaped bearing recesses to receive said oppositely facing inclined bearing surfaces of the annular enlargements of the rotary shaft, said inclined cooperating bearing surfaces of said plurality of annular enlargements and of said bearing recesses being of such dimensional extent as to provide definite spacing of the said inner and outer cylindrical portions of the rotary shaft from said bearing members, said inner cylindrical portion of said shaft between said annular enlargements being of smaller diameter than the said outer cylindrical portions at the outer side of said annular enlargements, the inner inclined bearing surfaces of said annular enlargements, which adjoin the smaller diameter inner cylindrical shaft portion, being of greater extent and bearing surface than the outer inclined bearing surfaces of said annular enlargements which adjoin the outer cylindrical portions at the outer sides of said enlargements, said structure providing balanced stability in the bearing assembly.

4. In a bearing structure, a rotary shaft member, a bearing member secured to a support and receiving a peripheral portion of the rotary shaft, a cap bearing member engaging a peripheral portion of the shaft and overlying the shaft and said secured bearing member, means connecting said bearing members comprising guide pin means secured to said secured bearing and extending through said cap bearing to permit slidable movement of said cap bearing on said pins relative to said secured bearing, and spring means secured to the outer ends of said pins and yieldably engaging said cap bearing to urge said cap bearing against the rotary shaft, said rotary shaft having an inner cylindrical portion of substantial length, and a plurality of spaced apart annular enlarged portions rigid with said shaft, one adjoining each end of said inner cylindrical shaft portion, said rigid spaced apart annular enlarged portions of said shaft each having oppositely facing annular inclined bearing surfaces and said bearing members having correspondingly shaped spaced apart bearing recesses to receive said oppositely facing inclined bearing surfaces of the spaced apart annular enlargements of the rotary shaft, said inclined cooperating bearing surfaces of said plurality of spaced apart annular enlargements and of said corresponding bearing recesses being of such relative dimensional extent as to provide definite spacing of the said cylindrical portion of the rotary shaft from said bearing members, said structure providing balanced stability and positive precision in the bearing assembly.

5. In a bearing structure according to claim 4, said spring means being unitary and having portions secured to the outer ends of said pins and having portions overlying and yieldably engaging said cap bearing at spaced locations thereon.

6. In a bearing structure according to claim 4, said cap bearing member having depending portions embracing and guided on said secured bearing member.

7. In a tangent arm micrometer screw structure for a sextant, with a rotary shaft carrying a tangent worm at one end and a micrometer drum structure at the other end thereof, an inner elongated bearing member secured to the index arm of the sextant and being recessed throughout its length and receiving a portion of the periphery of said rotary shaft, an elongated outer cap bearing member recessed throughout its length and complementary to said inner bearing member and receiving a portion of the periphery of said shaft, the ends of said inner and outer complementary elongated bearing members being embraced in close proximity by the drum structure and worm, said drum structure and worm being of larger diameter than said shaft and substantially overlying the respective ends of said complementary bearing members, said inner bearing member being pivotally attached to said index arm and having a release finger thereon, screw pin means threadedly received in said pivoted inner bearing member and passing through said outer cap bearing member to permit slidable movement of said outer cap bearing member relative to said pivoted inner bearing member, spring means secured to the outer ends of said pin means and engaging the cap bearing member to urge it against the rotary shaft, said screw pin means being adjustable to adjust the tension on said spring means, said rotary shaft having an inner cylindrical portion of substantial length, and a plurality of spaced apart annular enlarged portions one adjoining each end of said inner cylindrical shaft portion, and outer cylindrical shaft portions one adjoining the outer side of each of said annular enlarged portions, said spaced annular enlarged portions of said shaft each having oppositely facing annular inclined bearing surfaces, and said bearing members having correspondingly shaped bearing recesses to receive said oppositely facing inclined bearing surfaces of the annular enlargements of the rotary shaft, said inclined cooperating bearing surfaces of said plurality of annular enlargements and of said bearing recesses being of such dimensional extent as to provide definite spacing of the said inner and outer cylindrical portions of the rotary shaft from said bearing members.

8. In a tangent arm micrometer screw structure for a sextant, with a rotary shaft carrying a tangent worm at one end and a micrometer drum structure at the other end thereof, an inner elongated bearing member secured to the index arm of the sextant and being recessed throughout its length and receiving a portion of the periphery of said rotary shaft, an elongated outer cap bearing member recessed throughout its length and complementary to said inner bearing member and receiving a portion of the periphery of said shaft, the ends of said inner and outer complementary elongated bearing members being embraced in close proximity by the drum structure and worm, said drum structure and worm being of larger diameter than said shaft and substantially overlying the respective ends of said complementary bearing members, said inner bearing member being pivotally attached to said index arm and having a release finger thereon, screw pin means threadedly received in said pivoted inner bearing member and passing through said outer cap bearing member to permit slidable movement of said outer cap bearing member relative to said pivoted inner bearing member, spring means secured to the outer ends of said pin means and engaging the cap bearing member to urge it against the rotary shaft, said screw pin means being adjustable to adjust the tension on said spring means, said rotary shaft having an inner cylindrical portion of substantial length, and a plurality of spaced apart annular enlarged portions one adjoining each end of said inner cylindrical shaft portion, and outer cylindrical shaft portions one adjoining the outer side of each of said annular enlarged portions, said spaced annular enlarged portions of said shaft each having oppositely facing annular inclined bearing surfaces, and said bearing members having correspondingly shaped bearing recesses to receive said oppositely facing inclined bearing surfaces of the annular enlargements of the rotary shaft, said inclined cooperating bearing surfaces of said plurality of annular enlargements and of said bearing recesses being of such dimensional extent as to provide definite spacing of the said inner and outer cylindrical portions of the rotary shaft from said bearing members, a vernier member embracing said shaft and disposed between said drum and the bearing members and overlying the proximate end of each of said complementary bearing members, and means securing the said vernier member to said pivoted inner bearing member.

9. In apparatus according to claim 8, said means securing the vernier member to the pivoted inner bearing member comprising screw means including a headed screw and an opening in the vernier member larger than the screw to permit adjustment of the vernier member in respect to the bearing and drum.

THOMAS O. BRANDON.

REFERENCES CITED

The following references are of record in the file of this patent:

UNITED STATES PATENTS

| Number | Name | Date |
|---|---|---|
| 1,383,950 | Hughes et al. | July 5, 1921 |
| 1,476,345 | McGee | Dec. 4, 1923 |
| 1,514,394 | Olmsted | Nov. 4, 1924 |
| 1,674,317 | Buff | June 19, 1928 |
| 1,743,979 | Radford et al. | Jan. 14, 1930 |
| 1,931,231 | Luker | Oct. 17, 1933 |
| 2,127,854 | Bath et al. | Aug. 23, 1938 |

FOREIGN PATENTS

| Number | Country | Date |
|---|---|---|
| 358,451 | Germany | Sept. 9, 1922 |
| 556,034 | Great Britain | Sept. 16, 1943 |